United States Patent [19]

Speros et al.

[11] 4,267,021

[45] May 12, 1981

[54] METHOD AND APPARATUS FOR SOLAR DISTILLATION

[76] Inventors: Dimitrios M. Speros; Philip C. Speros, both of 10293 Prouty Rd., Painesville, Ohio 44077

[21] Appl. No.: 881,613

[22] Filed: Feb. 27, 1978

[51] Int. Cl.$^3$ .......................... C02F 1/14; B01D 1/22
[52] U.S. Cl. .................... 202/176; 202/234; 202/236; 126/449; 203/10; 203/86; 203/DIG. 1; 203/89
[58] Field of Search .............. 126/417, 449; 203/DIG. 1, 10, 11, 100, 86, 89, DIG. 17; 202/234, 176, 236; 159/1 S

[56] References Cited

U.S. PATENT DOCUMENTS

| | | | |
|---|---|---|---|
| 2,141,330 | 12/1938 | Abbot | 202/234 |
| 2,398,291 | 4/1946 | Delano | 202/234 |
| 2,405,877 | 8/1946 | Delano | 202/234 |
| 2,445,350 | 7/1948 | Ginnings | 203/DIG. 1 |
| 2,843,536 | 7/1958 | Mount | 203/DIG. 1 |
| 3,104,210 | 9/1963 | Mount | 203/DIG. 1 |
| 3,290,230 | 12/1966 | Kobayashi | 203/DIG. 1 |
| 3,501,381 | 3/1970 | Delano | 202/234 |
| 3,875,926 | 4/1975 | Frank | 203/DIG. 1 |
| 4,118,283 | 10/1978 | Diggs | 202/234 |

OTHER PUBLICATIONS

Symposium on Saline Water Conversion, 1957, Maria Telkes, pp. 137–139.
First Internation Symposium on Water Desalination, Datta et al., Oct. 3–9, 1965.
Manual on Solar Distillation of Saline Water:Talbert et al, Battelle Memorial Institute, Apr. 1970 (pp. 93–94 & 219).
Chemical Abstracts 68 (1968), 81349q.
"Economical Investigation of Solar Water Distillation in Egypt", Sakr et al (1976).

*Primary Examiner*—Wilbur L. Bascomb, Jr.

[57] ABSTRACT

A single effect solar distillation apparatus of the tilted or inclined floor type is disclosed which absorbs solar energy to evaporate a liquid distilland more efficiently. The present distillation apparatus is especially useful for desalination of sea water and includes a number of structural improvements to utilize the absorbed solar energy in a basically more efficient manner than previous still designs of this type. The distilland is evaporated in the present solar distillation apparatus substantially without turbulence especially at the evaporating surfaces to avoid certain heat transfer losses previously encountered during distillation. This basically novel mode of solar distillation is achieved with a particular relationship between the evaporating and the condensing surfaces in the apparatus which further cooperate with an improved structure where said evaporation takes place. Additionally, improved distilland absorbing and evaporating means and improved distillate collection means in the present apparatus also cooperate to provide more efficient operation than heretofore realized. Increased efficiency can be achieved by pre-heating the distilland feed and tracking the sun during operation.

16 Claims, 3 Drawing Figures

METHOD AND APPARATUS FOR SOLAR DISTILLATION

BACKGROUND OF THE INVENTION

A number of different type single effect solar evaporation stills have been used primarily to distill sea water. One such type of sea water still utilizes an inclined or tilted floor member on which the sea water is fed to a porous covering and evaporated therefrom by impinging solar radiation. The purified water vapor condenses in the solar distillation apparatus on the inner surface of a transparent roof member. Wall members extending between said floor and roof members in solar stills of this general type all provide only a few inches of spacing so that the distilled water vapor proceeds primarily through turbulent mass flow to the roof condensing surface which serves exclusively as the distillate condensing and collecting surface.

Operating efficiency of the known single-effect horizontal or bay-type sea water stills has also been reported. A 1967 report describes the operation of a horizontal or basin-type still on the Aegean Island of Patmos and having 8,667 square meters of evaporating surface area produced 6,884 gallons per day of distilled water or three liters per square meter of evaporating surface area. A 1976 report describing operation of a different basin-type still construction in Giza with 27 square meters of evaporating surface area per unit also produced distillate at approximately 3 liters per square meter per day operation for an isolation rate of 5,950 kilocalories per square meter per day. The production efficiency of these horizontal stills can be computed using the heat of evaporation of water as 565 calories per gram to yield an efficiency of less than 30%. A more efficient inclined plane sea water still has also been reported as yielding 4.48 liters per square meter of evaporating surface area per day at an insolation rate of 5,430 kilocalories per square meter per day, to yield an efficiency of approximately 45%. The insolation was measured at the plane of the still which was inclined 30° to the horizontal elevation. The construction design for said improved inclined floor still included a distilland absorbing covering on the floor member in the form of glass fibers pressed into black colored plastic and a 2½ inch spacing existed between the floor and roof members of the apparatus. Problems encountered in the operation of this still design included non-uniform wetting of the distilland absorbing surface and surface fading due to the solar exposure which both reduced the operating efficiency of the apparatus considerably below a 45% efficiency within a few weeks.

SUMMARY OF THE INVENTION

It has now been discovered, surprisingly, that a 10–15% or greater increase in operating efficiency can be maintained with an inclined floor solar distillation apparatus by means of a novel construction which provides laminar flow of the evaporated distilland in a particular manner between the evaporating and condensing surfaces. Specifically, the vapor flow path in the present apparatus does not proceed in a turbulent transfer mode from the floor absorbing surface to the roof condensing surface but follows an indirect vortex pattern therebetween as more fully explained hereinafter. An inclined floor solar distillation apparatus exhibiting such novel mode of operation includes (a) chamber means having floor, roof and wall members which form an enclosed perimeter by abutting relationship wherein solar distillation takes place, (b) liquid distilland feed means having a longitudinally extending and horizontally oriented conduit member located at the top end of said enclosed perimeter and extending between the sidewalls, said conduit member feeding distilland to the floor member by wick action, (c) a liquid absorbent covering disposed on the floor member of said enclosed perimeter and operatively connected to the conduit member by wick means for continuous wetting of said covering by capillary action to feed the distilland at a predetermined flow rate, (d) sidewall members extending between said floor and roof members to intersect with top and bottom wall members and define said enclosed perimeter, the aggregate surface area of wall members being at least equal to the area of said floor member for laminar vapor flow in said enclosed perimeter which is substantially devoid of vapor turbulence during distillation, (e) a transparent roof member admitting solar radiation to be absorbed by the floor member, and (f) distillate collection means located at the bottom end of said enclosed perimeter and extending between the sidewall members. By virtually eliminating vapor turbulence during distillation in this manner, it becomes possible to preclude any return of the evaporated distillate to the evaporating surface and liquid distillate forms efficiently when vapor initially contacts the cooler condensing surfaces provided by the side and end wall members in the present apparatus. This mode of operation effectively prevents recirculation of the evaporated distillate which is a major cause of operating inefficiency in previously known solar stills. The laminar vapor flow pattern achieved in the present apparatus proceeds upwardly along the inclined floor evaporating member in a direction toward the wall member at the top end of said floor and proceeds upwardly thereon to intersect with the roof member where it proceeds downwardly along the underside surface of said roof member and completes a circular path by flowing downwardly along said bottom wall member to intersect with the evaporating surface again. A stagnant core of heated vapor also existing in the central region of the enclosed perimeter reduces undesired convection heat transfer directly from the evaporating surface to the underside condensing surface of the roof member. Principal condensation within the present apparatus takes place on said underside condensing surface of the roof member as a continuous liquid film and with significant further condensation also occurring primarily on the inner sidewall members of the apparatus.

In a preferred embodiment, distilland is provided continuously to the enclosed chamber by a horizontally disposed conduit member extending between the sidewall members which feed the distilland uniformly along its length by gravity forces to a liquid absorbent covering disposed on the floor member. Wick means cooperate with said conduit member to insure continuous wetting of the absorbent covering by capillary action at a predetermined flow rate and the distillate is collected in a plurality of trough depressions provided in the floor member at the base of the wall members. The enclosed chamber of said preferred apparatus has a rectangular cross section which is formed by intersection of the roof and floor members with wall members extending in a vertical direction from said floor member. The roof member in the preferred apparatus is entirely transparent and is constructed having an inner surface which can be uniformly wetted by the condensed distillate as a continuous film while the wall members may also be constructed in a similar manner to include transparent apertures for transmission of solar radiation which can further increase operating efficiency in the apparatus. The liquid absorbent covering disposed on the floor member in said preferred apparatus includes an irregular surface formed by fibrous material and which can further include a deposit of distilland absorbent particulate solids to increase the absorbency of the composite material for still greater operating efficiency in the apparatus.

Operation of the preferred solar distillation apparatus includes (a) continuously feeding liquid distilland to the top of the enclosed perimeter, (b) utilizing capillary action to continuously feed distilland at a predetermined flow rate sufficient to completely saturate the absorbent covering on the inclined floor while admitting solar radiation trasmitted by a transparent roof to heat the absorbed liquid, (c) maintaining the heat rate to said absorbed liquid whereby a vortex pattern of laminar vapor flow occurs which is substantially devoid of vapor turbulence, (d) condensing the vapor flow on the roof and the wall members in said enclosed perimeter, and (e) collecting the condensed vapor continuously at the bottom end of said enclosed perimeter for removal from the distillation apparatus.

If certain operational procedures are used with the above described preferred distillation apparatus, it is possible to improve the operating efficiency to a further degree. For example, external heating of the distilland prior to its introduction to the enclosed perimeter can be carried out with known solar energy heating means to increase the rate of distillation by as much as 140% under comparable insolation conditions. It has also been found that maintaining a temperature gradient of approximately 15° C. between the evaporating and condensing surfaces in the preferred apparatus further increases the operating efficiency. In this regard, the temperature difference can rise to a value as much as 30° C. while the evaporating surface temperature generally does not exceed 70° C. A thermal gradient of this magnitude can be achieved with wall members constructed of metals exhibiting a relatively high thermal conductivity, such as aluminum, and by having the floor and roof members spaced apart by said wall members to a 12-inch distance. For sea water distillation, it is also desirable to maintain the operating temperature of the floor evaporating surface at a relatively low value to retard deterioration of the absorbent covering and avoid precipitation of insoluble deposits from the distilland which interferes with distilland evaporation thereafter. A sufficient distilland flow rate is also maintained in the apparatus to saturate the absorbent floor covering as a still further means to help avoid deposition of distilland solids on the absorbent covering during sea water distillation.

DESCRIPTION OF THE PREFERRED EMBODIMENTS

Figure 1:
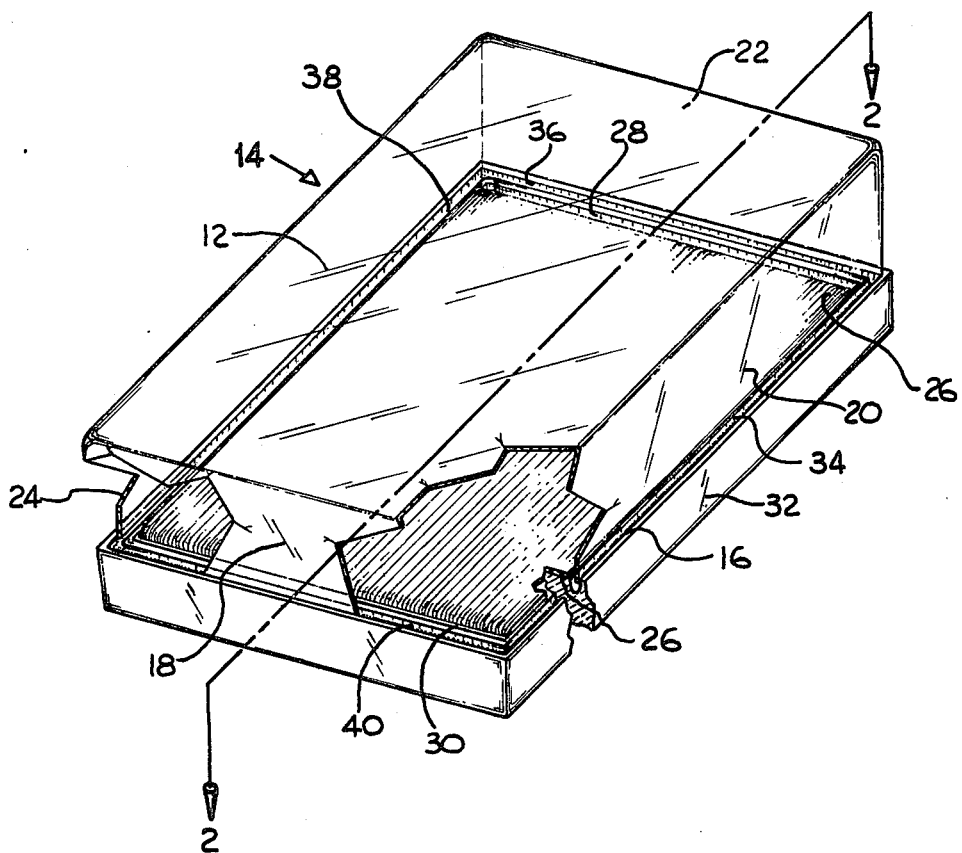
FIG. 1 is a perspective view partially in cross section for a preferred solar distillation apparatus of the invention.

Referring to the drawings, FIG. 1 shows a tilted frame or inclined floor type distillation apparatus 10 generally having a transparent roof member 12 which admits solar radiation to an enclosed chamber 14 which is formed by the intersection of said roof member and a floor member 16 with four wall members 18, 20, 22 and 24. Said floor member 16 includes a distilland absorbent covering 26 which extends between the distilland feed means 28 and the distilland discharge means 30 which, in turn, are located proximate to top wall member 22 and bottom wall member 18, respectively, whereas the underside of said floor member 16 further includes thermal insulation 32 which can provide some physical support to the entire distillation apparatus. Both distilland feed means 28 and distilland discharge means 30 consist of horizontal depressions formed on the top side of said floor member 16 and which extend between sidewall members 20 and 24. As more clearly shown in FIG. 2, the distilland absorbent covering 26 also extends into both depressions 28 and 30 to serve as a wick means enabling transport of the liquid distilland therebetween by capillary action. A uniform wetting of the floor covering 26 by the distilland is achieved in this manner with the flow rate of distilland to the distilland discharge conduit also being regulated by gravity forces so as to maintain continuous saturation of said floor covering. A further network of interconnected depressions 34, 36, 38 and 40 are formed in the top surface of said floor member 16 at the base of the wall members and aligned therewith to serve as the distillate collection means in the apparatus which operate by gravity flow for continuous distillate removal from said apparatus by discharge at depression 40.

Figure 2:
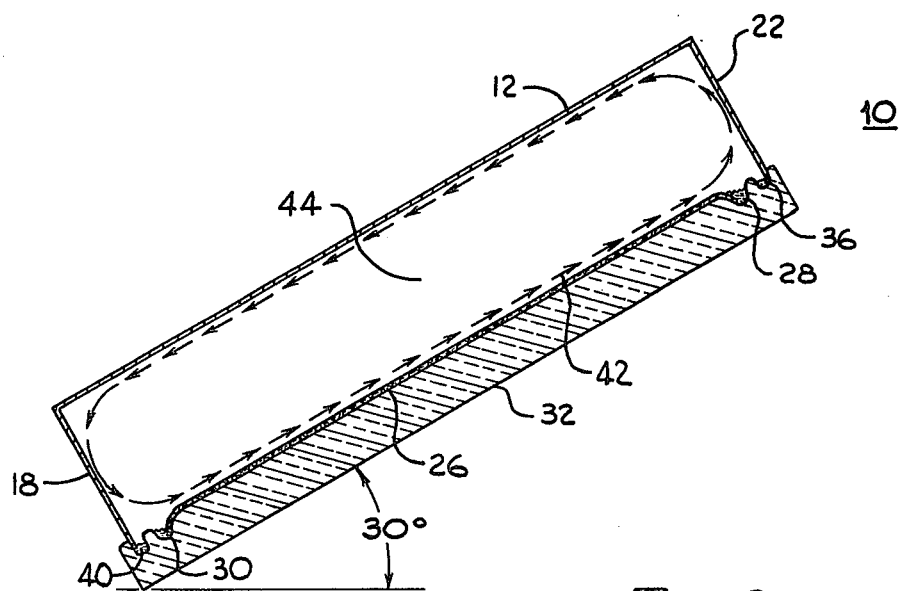
FIG. 2 is a cross sectional side view of the distillation apparatus depicted in FIG. 1.

In FIG. 2 there are shown a cross sectional view of the apparatus embodiment depicted in FIG. 1 which is taken along line 2—2 in FIG. 1. Accordingly, the same reference numerals appear in FIG. 2 to depict the structural configuration already described. The characteristic vortex pattern of laminar vapor flow 42 which is achieved in said apparatus during operation further appears schematically in FIG. 2. As can be noted, said vortex vapor flow pattern causes the evaporated distilland emerging from the absorbing surface 26 to proceed upwardly along said surface in the direction of the top wall member 22 and to circulate in a continued upward direction along said wall member to the underside surface of roof member 12 where the vapor flow path changes to a downward direction and proceeds along said underside surface toward bottom wall member 18 for continued downward flow along said bottom wall member and completion of the counterclockwise circuit path within the enclosed chamber. A central core region 44 of stagnant vapor also exists in the enclosed chamber during distillation which blocks direct transport of heated air and vapor from the evaporating surface to the condensing surface of the roof member and thereby serves to reduce convection heat losses which could otherwise occur in this manner. Such cooperative relationship between the vortex laminar flow pattern and the stagnant core of vapor during operation of the present apparatus substantially avoids formation of gaseous turbulence causing return of the vapor at the evaporating surfaces of the apparatus and thereby avoids still another major operating inefficiency encountered with conventional inclined floor solar stills.

It is essential for the above discovered mode of operation to provide a minimum of spacing of at least 3 inches between the evaporating floor surface and the underside condensing surface of the roof member. Moreover, it has been found further necessary in the preferred solar distillation apparatus above described to provide a 12-inch spacing between said surface for the proper temperature relationships to become established which result in laminar vapor flow. A 30° angle of repose for the described apparatus is also shown in FIG. 2 and this degree of inclination from a horizontal ground plane provides efficient sea water distillation. On the other hand, it is also well recognized that operating efficiency will depend upon the amount of solar flux incident to the distilland absorbent covering 26 in the apparatus and said energy further varies throughout the day depending upon sun location.

Construction of said distilland absorbent covering 26 in the preferred apparatus is of a composite hydrophillic nature and has an irregular surface to help wettability by the sea water distilland. Specifically, a felt or other fibrous fabric which is impregnated with a colloidal graphite suspension was found to provide an excellent water absorbing surface having sufficient uniform wettability to obviate including aperture openings in the distilland feed conduit 28 for uniform wetting of said covering. It will also be evident that the desired hydrophillic nature of the floor covering in the preferred sea water distillation apparatus can be provided in a number of different ways utilizing already known details of construction. The temperature of the absorbing covering is maintained during distillation not in excess of 70° C. to help preclude deterioration of the fabric over long time periods along with algae formation and/or undesirable deposits of insoluble solids from the sea water distilland. Additional structural features in the above described preferred distillation apparatus can serve to further promote operating efficiency by increasing solar flux to the apparatus or increasing the effectiveness of distillate condensation therein. Solar exposure of the apparatus can be maximized from a utilization of already known automatic tracking systems which employ gimbal arrangements to follow the sun by horizontal rotation around the vertical (azimuth) axis and also rotation around the horizontal (elevation) axis during the day and which can be operated automatically by simple descending weight means. It was found that such sun-tracking can more than double the fresh water output produced by the same unit in a fixed position. Additionally, transparent windows can be provided in the wall members of the apparatus to increase the amount of insolation to the apparatus. Effective distillate condensation in the apparatus is provided with an underside condensing surface on the roof member which is maintained hydrophillic in nature such as a clean glass surface and not providing sidewalls on the distilland feed or distillate collection troughs which protrude upwardly from the evaporating surface since undesired condensation could take place upon such projections.

Figure 3:
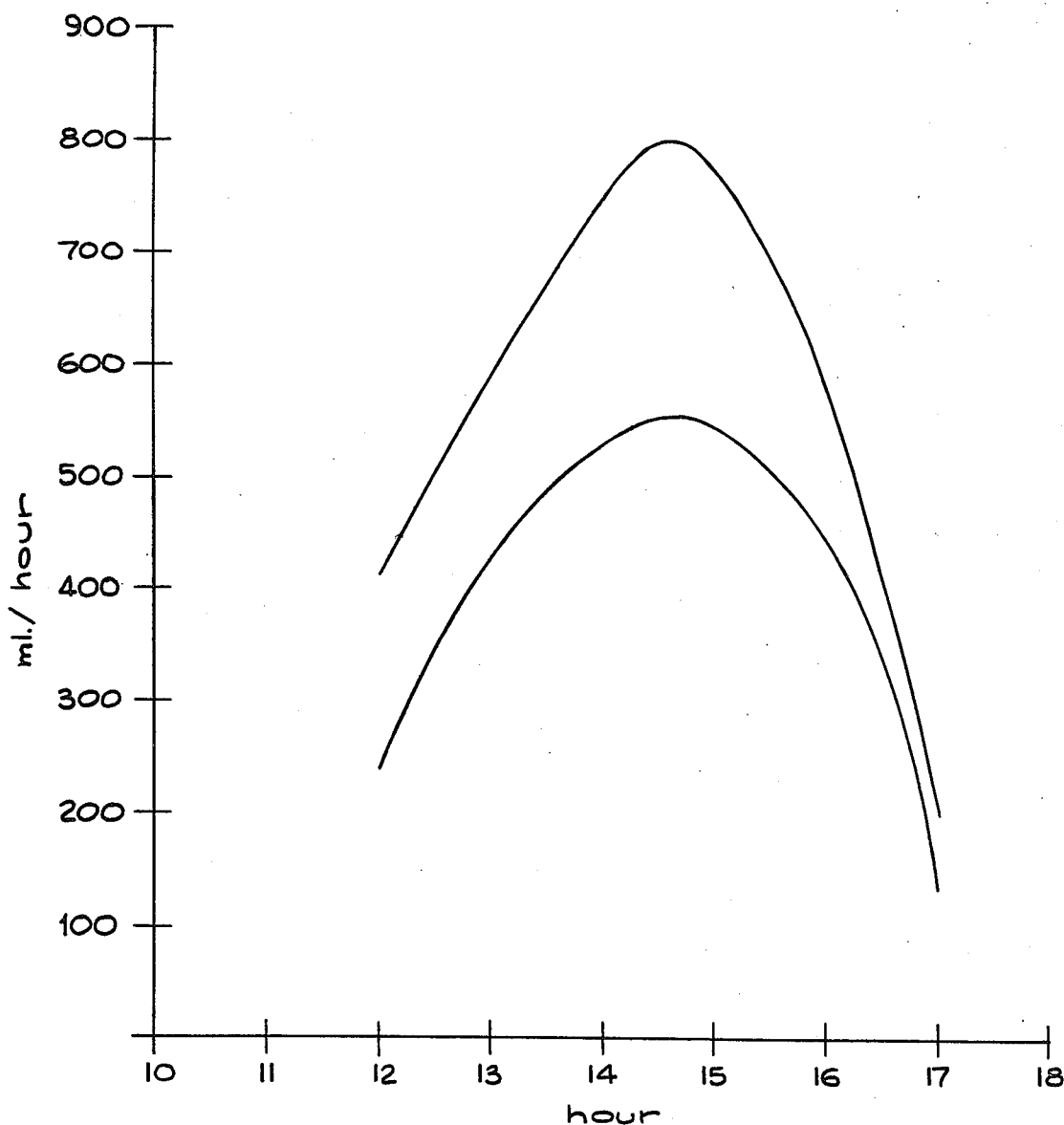
FIG. 3 is a performance graph of the solar distillation apparatus depicted in FIG. 1 when employed to distill sea water.

In FIG. 3 there is shown typical operating performance curves for the preferred distillation apparatus depicted in FIGS. 1 and 2 to illustrate the improvement resulting with preheated sea water distilland. The particular apparatus configuration employed for said performance evaluation utilized a square cross section floor member of one meter length on each side and with aluminum wall members extending in a vertical direction from said floor member to intersect with a transparent glass roof spaced approximately 12 inches therefrom. The apparatus was inclined 45° from a horizontal ground plane with the sun azimuth during said performance evaluation providing maximum flux or insolation to the absorbing surface at 2:30 in the afternoon. The feed rate of sea water distilland during said evaluation was approximately 1,200 milliliters per hour with the temperature of the evaporating surface in the apparatus varying up to a maximum of 59° C. during the reported measurements. The lower curve in FIG. 3 represents operation of said apparatus with sea water distilland being fed at ordinary ambient temperatures between approximately 10° and 15° C. The upper curve in FIG. 3 represents performance of the apparatus when the sea water distilland had been preheated with conventional solar energy heating means to approximately the same temperature as the temperature being maintained at the evaporating surface before its introduction to the enclosed chamber. A comparison between said curves of the distillate output from the apparatus in milliliters of distillate per hour makes it apparent that the operating efficiency can be significantly improved with preheated distilland. Specifically, a summation of the total outputs over the time period being measured illustrates at least a 140% greater output of distillate under comparable operating conditions when the distilland has been preheated in this manner. A calculation of operating efficiencies as previously described further illustrates the degree of improvement attributable to preheating of the distilland. Upon considering the 2,400 kilocalories involved during each type operation, an operating efficiency slightly in excess of 50% results for operation with unheated distilland whereas said operating efficiency increases to at least 70% when the distilland was preheated.

It will be apparent from the foregoing description that a generally improved solar distillation apparatus has been provided. It will also be apparent that modifications of the present invention other than above specifically described will be apparent to persons skilled in the art. For example, alternate materials of construction for said apparatus other than specifically disclosed above are contemplated along with utilization of wall members which are constructed from optically transparent materials. It is intended to limit the present invention, therefore, only by the scope of the following claims.

What we claim as new and desire to secure by U.S. Letters Patent is:

1. An inclined floor solar distillation apparatus which comprises:
   (a) chamber means including floor, roof, bottom, top and side wall members which form an enclosed perimeter about an inclined floor member by abutting relationship where solar distillation takes place,
   (b) liquid distilland feed means including a longitudinally extending conduit member located at the top end of said enclosed perimeter and extending between the side walls, said conduit member feeding distilland to the floor member,
   (c) a liquid absorbent covering disposed on the floor member of said enclosed perimeter and operatively connected to the conduit member by wick means for continuous wetting of said covering by a capillary action to feed the distilland at a predetermined flow rate, (d) sidewall members extending between floor and roof members to intersect with top and bottom wall members and define said enclosed perimeter, the aggregate surface area of said wall members being at least equal to the surface area of said floor member for laminar vapor flow in said enclosed perimeter which is substantially devoid of vapor turbulence during distillation, (e) a transparent roof member admitting solar radiation to be absorbed by the floor member, and (f) distillate collection means located at the bottom end of said enclosed perimeter and extending between the side wall members.

2. A solar distillation apparatus as in claim 1 wherein the conduit member of the liquid distilland feed means is positioned at a horizontal elevation to feed distilland uniformly along its length.

3. A solar distillation apparatus as in claim 1 wherein distilland flow on the liquid absorbent covering is caused entirely by gravity forces.

4. A solar distillation apparatus as in claim 1 wherein the floor member of the enclosed perimeter includes thermal insulation.

5. A solar distillation apparatus as in claim 1 wherein the liquid absorbent covering disposed on the floor member includes an irregular surface.

6. A solar distillation apparatus as in claim 5 wherein the irregular surface of the liquid absorbent covering is formed by fiber.

7. A solar distillation apparatus as in claim 5 wherein the irregular surface of the liquid absorbent covering is of a hydrophillic nature.

8. A solar distillation apparatus as in claim 1 wherein the inner surface of the transparent roof member permits condensation of the distillate as a continuous liquid film.

9. A solar distillation apparatus as in claim 8 wherein the inner surface of the transparent roof member is hydrophillic in nature.

10. A solar distillation apparatus as in claim 1 wherein the transparent roof member is glass.

11. A solar distillation apparatus as in claim 1 wherein said enclosed perimeter has a rectangular cross section and the wall members extend in a vertical direction from the floor member.

12. A solar distillation apparatus as in claim 1 wherein the side wall members include trough elements to conduct distillate condensing on the inner surfaces of said wall members of the distillate collector means.

13. A solar distillation apparatus as in claim 1 wherein the conduit member of the liquid distilland feed means comprises a trough depression in the floor member.

14. A solar distillation apparatus as in claim 13 wherein said floor member further includes another trough depression serving as the distillate collection means in the enclosed perimeter.

15. A solar distillation apparatus as in claim 1 wherein the enclosed perimeter has a rectangular cross section formed by side wall members, a top wall member, and a bottom wall member, all said wall members extending in a vertical direction and including trough elements to conduct distillate condensing on the inner surfaces of said wall members to the distillate collection means.

16. A solar distillation apparatus as in claim 15 wherein all of said trough elements comprise depressions in the floor member at the base of each wall member.

* * * * *